(12) United States Patent
Shin et al.

(10) Patent No.: US 8,043,466 B1
(45) Date of Patent: Oct. 25, 2011

(54) ETCHING APPARATUS

(75) Inventors: Woo-Sup Shin, Kyongsangbuk-do (KR); Jae-Gyu Jeong, Taegu (KR)

(73) Assignee: LG Display Co., Ltd, Seoul (KR)

( * ) Notice: Subject to any disclaimer, the term of this patent is extended or adjusted under 35 U.S.C. 154(b) by 334 days.

(21) Appl. No.: 09/039,438

(22) Filed: Mar. 16, 1998

(30) Foreign Application Priority Data

Mar. 21, 1997 (KR) .................................. 97-9786

(51) Int. Cl.
*C23F 1/00* (2006.01)
*H01L 21/306* (2006.01)

(52) U.S. Cl. ......... 156/345.13; 156/345.16; 156/345.18; 156/345.24; 156/345.27

(58) Field of Classification Search ............... 134/72–75; 156/345, 345.11, 345.15, 345.16, 345.17, 156/345.18, 345.24, 345.25, 345.27, 345.28, 156/345.13; 216/84, 83, 96–98, 103, 104; 438/745, 756
See application file for complete search history.

(56) References Cited

U.S. PATENT DOCUMENTS

| | | | | |
|---|---|---|---|---|
| 3,532,568 A * | 10/1970 | Schutt et al. | ............. | 216/87 |
| 3,689,333 A | 9/1972 | Hillhouse | ............. | 156/14 |
| 3,756,898 A | 9/1973 | Frantzen et al. | ............. | 156/345 |
| 3,869,313 A * | 3/1975 | Jones et al. | ............. | 134/73 |
| 4,125,594 A | 11/1978 | Su et al. | ............. | 423/488 |
| 4,147,581 A | 4/1979 | Nelson | ............. | 156/345 |
| 4,240,880 A | 12/1980 | Tsuchibuchi et al. | ............. | 204/15 |
| 4,332,649 A | 6/1982 | Salzle | ............. | 204/98 |
| 4,338,157 A * | 7/1982 | Kanda | ............. | 438/6 |
| 4,341,841 A | 7/1982 | Ohno et al. | ............. | 428/414 |
| 4,462,856 A * | 7/1984 | Abe et al. | ............. | 156/345.16 |
| 4,482,425 A | 11/1984 | Battey | ............. | 156/637 |
| 4,501,636 A | 2/1985 | Valley | ............. | 156/345 |
| 4,624,729 A | 11/1986 | Bresciani et al. | ............. | 156/345 |
| 4,715,686 A | 12/1987 | Iwashita et al. | ............. | 349/137 |
| 4,826,556 A | 5/1989 | Kobayashi | ............. | 156/345 |
| 4,846,868 A | 7/1989 | Aratani | ............. | 65/30.14 |
| 4,886,590 A * | 12/1989 | Tittle | ............. | 204/232 |
| 4,953,952 A | 9/1990 | Okumura et al. | ............. | 350/337 |

(Continued)

FOREIGN PATENT DOCUMENTS

DE 1 920 009 10/1970

(Continued)

OTHER PUBLICATIONS

Serway, R.A."Physics for Scientists & Engineers", 2nd Ed., Saunders College Publishing, 1986. pp. 428.*

(Continued)

*Primary Examiner* — Rudy Zervigon
(74) *Attorney, Agent, or Firm* — McKenna Long & Aldridge LLP

(57) ABSTRACT

An etching apparatus is provided for etching a substrate. The etching apparatus includes a first tank including a first etchant, and an etch bath connected to the first tank and receiving the first etchant, the etch bath containing a residual etchant including a diluted etchant and residue material after the substrate is etched with the first etchant. The etching apparatus further includes a second tank receiving the residual etchant from the etch bath and separating the diluted etchant from the residue material, a connecting passage connecting the first and second tanks for transferring the separated diluted etchant from the second tank to the first tank, and an outlet pipe attached to the second tank for discharging the residue material.

6 Claims, 3 Drawing Sheets

U.S. PATENT DOCUMENTS

| | | | |
|---|---|---|---|
| 4,980,017 A | 12/1990 | Kaji et al. | 216/93 |
| 5,000,795 A | 3/1991 | Chung et al. | 137/37 |
| 5,002,627 A | 3/1991 | Scheithauer et al. | 156/345 |
| 5,082,518 A | 1/1992 | Molinaro | 156/345 |
| 5,112,437 A | 5/1992 | Watanabe et al. | 156/646 |
| 5,112,453 A | 5/1992 | Behr et al. | 205/641 |
| 5,159,787 A | 11/1992 | Suenaga et al. | 156/326 |
| 5,164,018 A | 11/1992 | Barcelona, Jr. | 134/28 |
| 5,246,540 A | 9/1993 | Soda | 156/663 |
| 5,251,980 A | 10/1993 | Hiraoka et al. | 374/7 |
| 5,277,715 A | 1/1994 | Cathey | 134/2 |
| 5,319,479 A | 6/1994 | Yamada et al. | 359/58 |
| 5,371,619 A | 12/1994 | Sirkin et al. | 359/53 |
| 5,378,308 A | 1/1995 | Thoms | 156/640 |
| 5,389,148 A | 2/1995 | Matsunaga | 118/300 |
| 5,429,711 A | 7/1995 | Watanabe et al. | 216/52 |
| 5,434,433 A | 7/1995 | Takasu et al. | 257/59 |
| 5,505,804 A | 4/1996 | Mizuguchi et al. | 156/154 |
| 5,514,850 A | 5/1996 | Miyazaki et al. | 219/121.69 |
| 5,540,784 A | 7/1996 | Ranes | 134/10 |
| 5,543,181 A | 8/1996 | Fehn et al. | 427/421 |
| 5,560,838 A * | 10/1996 | Allies et al. | 216/93 |
| 5,654,057 A | 8/1997 | Kitayama et al. | 428/64.1 |
| 5,701,165 A | 12/1997 | Kubo et al. | 349/5 |
| 5,766,493 A | 6/1998 | Shin | 216/23 |
| 5,767,931 A | 6/1998 | Paczkowski | 349/158 |
| 5,781,255 A | 7/1998 | Yamamoto et al. | 349/46 |
| 5,788,871 A | 8/1998 | Huh | 216/84 |
| 5,808,715 A | 9/1998 | Tsai et al. | 349/122 |
| 5,818,559 A | 10/1998 | Yoshida | 349/122 |
| 5,819,434 A | 10/1998 | Herchen et al. | 34/232 |
| 5,835,176 A | 11/1998 | Jeong et al. | 349/124 |

FOREIGN PATENT DOCUMENTS

| | | |
|---|---|---|
| DE | 36 11 387 | 10/1987 |
| DE | 38 85 044 T2 | 3/1989 |
| DE | 39 23 254 A1 | 1/1991 |
| DE | 43 31 666 A1 | 3/1995 |
| DE | 38 53 904 | 10/1995 |
| EP | 0 474 474 | 3/1992 |
| EP | 0 586 147 | 3/1994 |
| EP | 0 659 521 | 6/1995 |
| FR | 1.200.180 | 12/1959 |
| GB | 829605 | 3/1960 |
| GB | 2 178 894 | 2/1987 |
| GB | 2 178 895 | 2/1987 |
| JP | 60-163435 | 8/1985 |
| JP | 1-189631 | 7/1989 |
| JP | 2-97024 | 4/1990 |
| JP | 2-141703 | 5/1990 |
| JP | 2-196222 | 8/1990 |
| JP | 2-138459 | 11/1990 |
| JP | 3-22390 | 1/1991 |
| JP | 4-116619 | 4/1992 |
| JP | 4-163528 | 6/1992 |
| JP | 5-61011 | 3/1993 |
| JP | 5-129238 | 5/1993 |
| JP | 5-249422 | 9/1993 |
| JP | 5-249423 | 9/1993 |
| JP | 5-315317 | 11/1993 |
| JP | 7-37851 | 2/1995 |
| JP | 7-45600 | 2/1995 |
| JP | 7-58078 | 3/1995 |
| JP | 7-168172 | 7/1995 |
| JP | 8-45898 | 2/1996 |
| JP | 8-141481 | 6/1996 |
| JP | 8-306628 | 11/1996 |

OTHER PUBLICATIONS

U.K. Search Report dated Jun. 8, 1998.

Von Bernd Hartmann, *Neue Recyclingtechniken und Abwasserbehandlungsmethoden*; Technische Rundschau 37/90 pp. 104-109.

* cited by examiner

ETCHING APPARATUS

This application claims the benefit of Korean Patent Application No. 97-9786, filed on Mar. 21, 1997, which is hereby incorporated by reference. Also, this application is related to a commonly assigned copending application Ser. No. 09/002,037 filed on Dec. 31, 1997 entitled "METHOD OF FABRICATING A SUBSTRATE," which is also incorporated herein by reference.

BACKGROUND OF THE INVENTION

1. Field of the Invention

The present invention relates to an etching apparatus, and more particularly, to an etching apparatus for manufacture of a liquid crystal display (LCD).

2. Description of the Related Art

An LCD uses a liquid crystal screen formed by coupling a first glass substrate having display or switching elements and a second glass substrate having color filters. In order to form such elements on the first glass substrate, metal layers, insulating films, and amorphous silicon layers are deposited on the first glass substrate and are patterned several times. The majority of LCD panels utilize a glass substrate since the glass substrate is transparent, can be processed at a temperature of up to about 400° C., and easily available. However, the glass substrate has a high density and is fragile. In the course of processes described above, the glass substrate is exposed to temperatures that vary from room temperature to 300° C., and accordingly, it may be damaged due to resultant physical and/or thermal stresses.

LCDs should be formed as thin and light as possible, but factors such as described above, limit the thinning of the glass substrate (currently, it is possible to reduce the thickness of a single glass substrate down to 0.7 mm, for example). Further, since the thinning of the glass substrate is more limited as the size of the glass substrate increases, it is very important to solve the problem in view of the current trend of increasing the size of the glass substrate (at present, the size is increased from 300 by 400 mm to 370 by 470 mm, and further, to 550 by 650 mm).

Recently, an alternative approach has been proposed for solving this problem. A thick glass substrate is used at the beginning of the process in order to prevent the substrate from breaking, and then the thick glass substrate is thinned at a later stage. That is, after upper and lower glass substrates are prepared by forming, for example, switching elements and color filters on the respective glass substrates and then sealed to each other, the resultant panel is thinned by removing portions of the outer surfaces of the substrate. Since the above process sequence can decrease the breakage rate of the glass substrates and the defect ratio of the elements, it is possible to improve the production yield of LCDs.

Two methods are available to thin the glass substrate: a method using polishing powder for physically grinding the substrate and a method using acid solutions for etching the substrate.

An etching apparatus for wet etching includes a loader for loading a cassette, in which multiple sealed panels are vertically inserted in the slots therein in order to facilitate transfer of the panel, and an etch bath for use in the etching process of the sealed substrates using an etchant after moving the cassette from the loader to the etch bath. The etching apparatus further has a rinse bath for use in the cleaning process of the substrate after moving the etch-processed cassette from the etch bath to the rinse bath, a dry bath for use in the drying process of the substrate after moving the cleaned cassette from the rinse bath to the dry bath, and an unloader for use in unloading the dried cassette from the dry bath to a site for conveying the substrates to other process apparatus. In the etch apparatus, the transfer of the cassette is automatically performed by an automatic conveying system.

FIG. 1 illustrates a conventional etching apparatus, which shows only an etch bath and parts directly related to the wet etching process of the substrate.

In the conventional etch apparatus as shown in FIG. 1, the etch bath 20 has an inner space in which a cassette can be positioned, and is connected to an etchant diluting tank 12 for supplying an etchant via an etchant inlet pipe 21. A bubble generating plate 27, which generates nitrogen bubbles for uniformly stirring the etchant, is installed at the bottom of the etch bath 20 and connected to a nitrogen supply line 52 via a nitrogen inlet pipe 22.

An HF supply barrel 11 for supplying undiluted HF solution as the etchant is connected to the etchant diluting tank 12 via an undiluted HF inlet pipe 16. Distilled water (D. I. water) supply line 51 is also connected to the etchant diluting tank 12 via a pure water inlet pipe 17.

The outlet pipe 19 of the etchant diluting tank 12 and the outlet pipe 2 of the etch bath 20 are connected to a discharging line 53 for disposing. On/off valves V1, V2, V3, V4, and V5 are installed on the respective inlet pipes and outlet pipes, so that the flow of the fluid including the D. I. water and the etchant can be controlled. A concentration measuring unit 15 is provided for measuring the concentration of the etchant in the etchant diluting tank 12.

The etching process using the conventional etching apparatus above will be explained. First, a cassette is positioned on the loader (not shown). The valve V1 on the undiluted HF solution inlet pipe 22 is opened and then a pump P1 is activated, so that the undiluted HF solution in the HF solution barrel 11 is supplied to the etchant diluting tank 12. At the same time, the valve V3 in the D.I. water inlet pipe 17 is opened to supply the D. I. water in the D. I. water supply line 51 to the etchant diluting tank 12. As a result, the undiluted HF solution is diluted with the D. I. water. At this time, the etchant of a predetermined concentration is prepared by controlling the amounts of both HF solution and D. I. water. The concentration of the etchant prepared is measured by the concentration measuring unit 15 in the etchant diluting tank 12.

When the preparation of the etchant is completed, the supply of the HF solution and D. I. water is stopped, and the valve V2 on the etchant inlet pipe 21 is opened. Then, a pump P2 is activated to fill the etch bath 20 with the etchant. Thereafter, the cassette on the loader is dipped into the etch bath 20 to start the wet etch process of the glass substrates in the cassette. At this time, nitrogen gas is supplied into the etch bath 20 via the bubble generating plate 27 to enhance the etch process. The nitrogen gas is supplied through the bubble generating plate 27 to generate bubbles in the etchant and stir the etchant. The nitrogen gas is continuously supplied to the etchant through the nitrogen inlet pipe 22 connected to the nitrogen supply line 52 so that the stirring of the etchant can be continued throughout the etch process. When the time period set at the etching apparatus for etching the glass substrates is lapsed, the etching process of the glass substrates is stopped. The time period for etching the glass substrates is adjusted in accordance with the concentration of the etchant and the thickness of the glass substrate.

Next, another cassette (not shown), in which the glass substrates are loaded in the slots thereof, is moved into the etch bath, and the same process is performed. Thereafter, the subsequent etching step is performed. The residual etchant used in each etching process is guided into the discharging line 53 through the outlet pipe 2 of the etch bath 20 and then discharged outside.

The glass substrate etched by the etchant is composed of oxides, such as $SiO_2$, BaO, CaO or $Al_2O_3$ in its amorphous state, for example. The HF solution used as the etchant dissolves only $SiO_2$, a main component of the glass substrate, when it is reacted with the glass substrate. The corresponding reaction equation is as follows:

$$SiO_2 + 4HF \rightarrow SiF_2\uparrow + 2H_2O$$

Since the rest of the oxides are not dissolved in the HF etchant, they exist in the etchant in the form of particles. As a result, the residual etchant discharged from the etch bath includes the HF solution of low concentration and many oxide particles resulting from the chemical reaction of the etchant with the $SiO_2$ components of the glass substrates.

The conventional etching apparatus discharges all the residual etchant used in the etching process through the discharging line, and the HF solution included in the residual etchant is not used again. Further, since the improperly handled HF solution may cause pollution, the discharged HF solution needs to be properly disposed. It is desirable that the residual etchant is reused (recycled) to reduce the amount of the residual HF solution to be disposed of.

Furthermore, since in the conventional etching process, the change in concentration of the HF etchant is not considered when determining the etching end point (the etching time was determined by initial etching parameters), the glass substrates are not etched consistently. Since the etching uniformity of the glass substrates depends on the variable concentration of the etchant as well as the thickness of the glass substrate, in order to control the resultant thickness of the glass substrate, it is necessary to correctly measure the HF concentration of the etchant used in the etching process and flexibly adjust the etch time according to the HF concentration. However, it is difficult to measure the HF concentration periodically and correctly. Furthermore, since the conventional etching apparatus cannot be used to etch a large number of glass substrates consistently, it cannot be used for mass production.

SUMMARY OF THE INVENTION

Accordingly, the present invention is directed to an etching apparatus that substantially obviates the problems due to limitations and disadvantages of the related art.

An object of the present invention is to provide an etching apparatus in which the etching solution in the residual etchant is not entirely discharged and most of the etching solution is recycled.

Another object of the invention is to provide an etching apparatus that can automatically determine the end point of the etching.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an etching apparatus for etching a substrate including a first tank including a first etchant; an etch bath connected to the first tank and receiving the first etchant, the etch bath containing a residual etchant including a diluted etchant and residue material after the substrate is etched with the first etchant; a second tank receiving the residual etchant from the etch bath and separating the diluted etchant from the residue material; a connecting passage connecting the first and second tanks for transferring the separated diluted etchant from the second tank to the first tank; and an outlet pipe attached to the second tank for discharging the residue material.

In another aspect, the present invention provides an etching apparatus for etching a substrate with an etchant, including an etch bath adapted to receive the substrate into the etchant for etching the substrate; a temperature sensor installed in the etch bath for monitoring a temperature of the etchant while the substrate is etched in the etch bath; and a control unit for receiving a signal indicating the temperature of the etchant from the temperature sensor and transmitting an etching termination signal to the etch bath when the temperature reaches a predetermined temperature.

In another aspect, the present invention provides an etching apparatus for etching a substrate including a first tank including a first etchant; an etch bath connected to the first tank for receiving the first etchant and adapted to etch the substrate with the first etchant, the etch both producing a residual etchant including a diluted etchant and residue material as a result of etching the substrate; a separation tank adapted to receive the residual etchant from the etch bath for separating the diluted etchant from the residue material, the separation tank transferring the separated diluted etchant to the first tank; a rinse bath for cleaning the substrate that is etched in the etch bath; a dry bath for drying the substrate that is rinsed at the rinse bath; a solvent supply source for supplying solvent water to the first tank; an etching solution source for supplying an etching solution to the first tank; and a control unit for controlling the etch bath, the rinse bath, the dry bath, the first tank, and the separation tank.

In another aspect, the present invention provides an etching apparatus including a first tank for manufacturing an etchant; an etch bath supplied with the etchant from the first tank for performing an etching process; a second tank supplied with the residual etchant comprising residues resulting from the etching process from the etch bath for separating the residual etchant into the etchant of low concentration and the residues; a connecting pipe connected with the first and second tanks for conveying the etchant of low concentration from the second tank to the first tank; and a discharging pipe installed in the second tank for discharging the separated residues.

In a further aspect, the present invention provides the etching apparatus including an etch bath for performing an etching process of substrates dipped into an etchant; an temperature sensor installed in the etch bath for measuring a first temperature of the etchant during the etching process; and a central control unit for reading the first temperature from the temperature sensor, comparing the first temperature with the second temperature preset and transmit a signal to the etch bath to stop the etching process if the first temperature matches with the second temperature.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
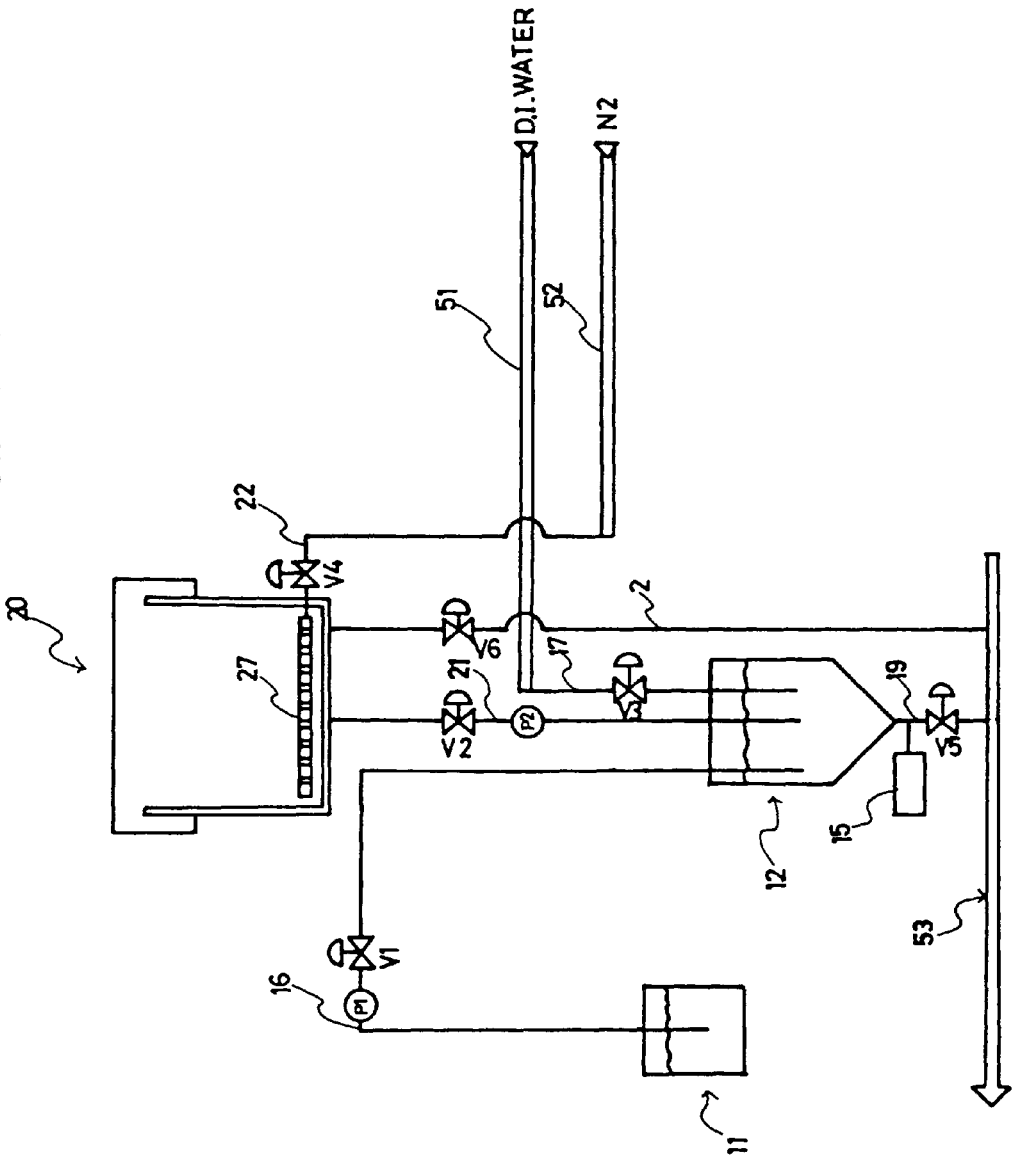
FIG. 1 is a schematic view illustrating a conventional etching apparatus.
Figure 2:
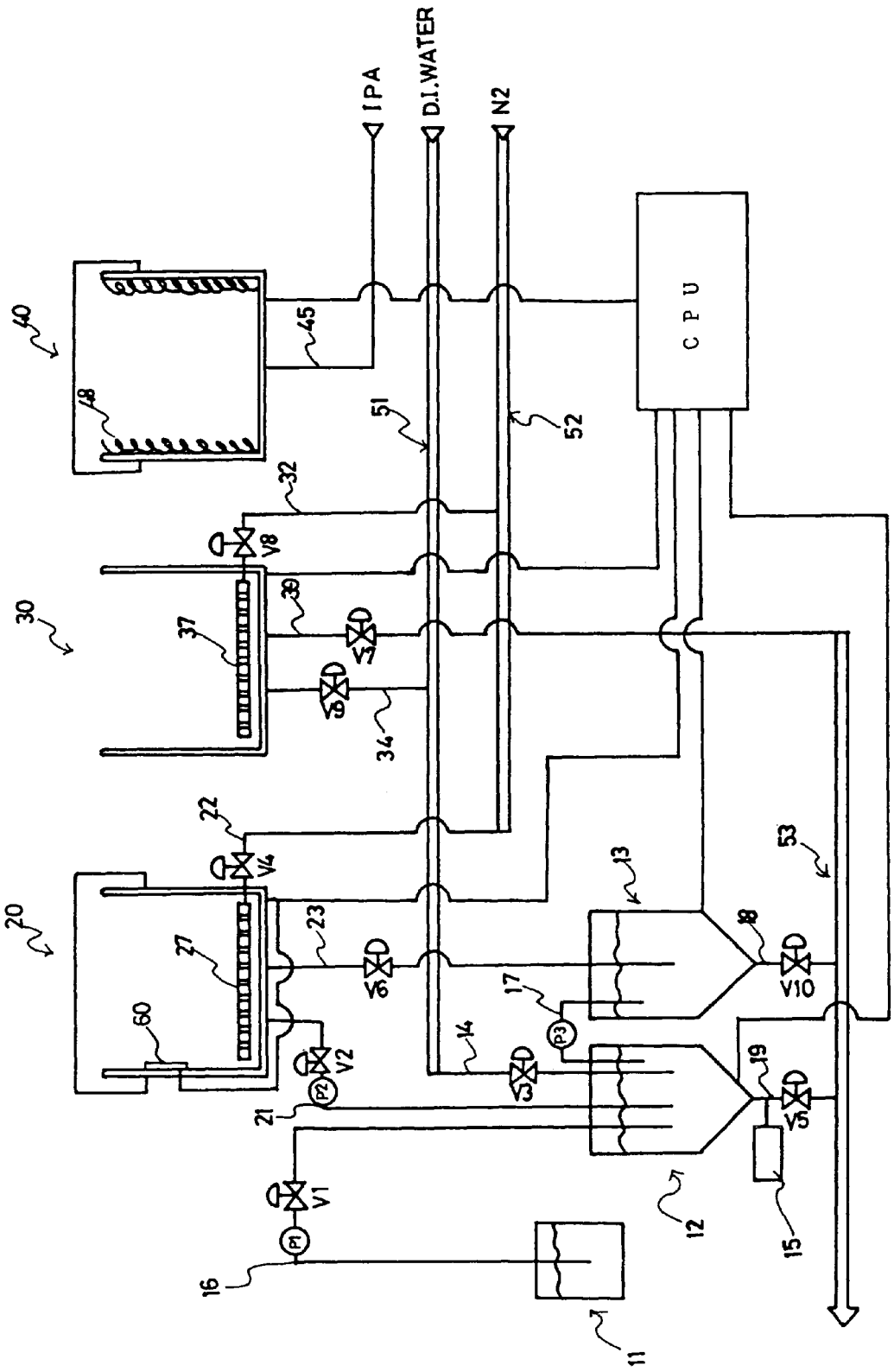
FIG. 2 is a schematic view illustrating an etching apparatus according to a preferred embodiment of the present invention.

FIG. 2 shows the schematic constitution of an etching apparatus according to a preferred embodiment of the present invention. In the etching apparatus shown in FIG. 2, an etch bath 20, a rinse bath 30, and a dry bath 40 are installed, and an oxide separating tank 13 and an etchant diluting tank 12 are connected to the etch bath 20. Each of the etch bath 20, the rinse bath 30, the dry bath 40, the oxide separating tank 13, and the etchant diluting tank 12 is preferably formed of a teflon resin, for example, which is durable against acid solutions. Each of them is connected to a central control unit so that they can be automatically operated.

The etch bath 20 for performing the etching process of the substrates has a receptor (not shown in figure) for receiving a cassette having slots in which substrates such as sealed glass panels are inserted. A bubble generating plate 27 for generating nitrogen bubbles is installed at the bottom of the etch bath 20 and is connected to a first nitrogen inlet pipe 22 connected to a nitrogen supply line 52. A temperature sensor 60, which is connected to the central control unit and measures the temperature of the etchant, is installed in the etch bath 20. The central control unit receives data from the temperature sensor 60 to monitor the temperature change during the etching process and determine the etching end point of the etching process.

The etch bath 20 is connected to the etchant diluting tank 12 via an etchant inlet pipe 21 and to an oxide separating tank 13 via an etchant outlet pipe 23. The etchant diluting tank 12 and the oxide separating tank 13 are connected to each other via a connecting pipe 17 provided with a pump P3 for transferring the etchant from the oxide separating tank 13 to the etchant diluting tank 12. The etchant diluting tank 12 is connected to an undiluted HF solution tank 11 via an undiluted HF solution inlet pipe 16 and to a D.I. water supply line 51 via a first D.I. water inlet pipe 14. The outlet pipe 19 of the etchant diluting tank 12 and the outlet pipe 18 of the oxide separating tank 13 are respectively connected to a discharging line 53.

The rinse bath 30 is provided for rinsing the substrates that are wet-etched and has a receptor for receiving a cassette (not shown in the figure). A bubble generating plate 37 for generating nitrogen bubbles used for the circulation of the etchant is installed at the bottom of the rinse bath 30 and connected to a nitrogen supply line 52 via a second nitrogen inlet pipe 32. The D.I. water supply line 51 is connected to the rinse bath 30 via a second D.I. water inlet pipe 34. A discharging pipe 39 for discharging the etchant used in the etching process is also connected to the rinse bath 30. The discharging pipe 39 of the rinse bath 30 is connected to the discharging line 53 to discharge the etchant.

The dry bath 40, which is used to dry the sealed substrates after the etching and rinsing processes, has a receptor for receiving the cassette. A heater 48 for supplying heat to dry the cassette is installed at the sides of the dry bath 40. An IPA (isopropyl alcohol) supply line 45 for supplying the IPA used in the dry process is connected to the dry bath 40. On/off valves V1 through V10 are installed on the respective inlet pipes and outlet pipes to control the flows of fluids. A concentration measuring unit 15 is provided for measuring the concentration of the etchant in the etchant diluting tank 12.

Now, the operation of the present embodiment will be explained. As briefly discussed in the Related Art section above, $SiO_2$ in the glass substrates (60% of the glass substrate, for example) is dissolved by the HF solution in the etch bath and the rest of oxides in the glass substrate are melted into the etchant in the form of particles. As a result, the thickness of the glass substrate is reduced. HF and $SiO_2$ react as follows:

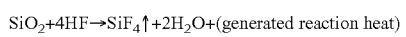

$$SiO_2 + 4HF \rightarrow SiF_4\uparrow + 2H_2O + \text{(generated reaction heat)}$$

This is an exothermic reaction which predominantly occurs in the wet etch process of glass material in the HF solution. In general, the reaction energy of a chemical reaction is proportional to the mole number of the compounds involved in the reaction. Therefore, if a sufficient amount of the HF solution is provided, the number of the mole of the $SiO_2$ is proportional to the reaction energy Q. As a result, the total reaction energy in the wet etch process of the glass substrate can be used as a reference, from which the etched amount of $SiO_2$ in the glass substrate can be determined.

The above concept is applied to the etching process performed in the etching apparatus of the present invention, as follows.

The temperature of the etchant is affected by the reaction energy because the temperature of the etchant can be represented by, $$Q(\text{Reaction Energy}) = m(\text{Mass of Etchant}) \times C(\text{Heat Capacity of Etchant}) \times \Delta t(\text{Change in the temperature of the etchant}).$$

Since the values of m and C do not fluctuate substantially during etching for a given initial condition, only the reaction energy generated from the etching reaction changes the temperature of the etchant. Thus, if the change in the temperature of the etchant $\Delta t$ is known, the reaction energy can be obtained. Therefore, the decrease in the thickness of the glass substrate and thus the etched thickness of the glass substrate can be derived from the temperature change of the etchant.

To etch the glass substrate by a predetermined thickness, the reaction energy corresponding to the predetermined thickness is first determined, and the expected temperature change of the etchant are determined. Using the expected temperature change, the temperature of the etching termination point is determined as an end point temperature. Therefore, when the temperature of the etchant reaches the end point temperature during the etching, the central control unit transmits a signal to the etch bath to stop the etch process in the etch bath. Here, the actual end temperature of the etchant in the etch bath 20 may be sensed. Alternatively, the temperature change based on the initial temperature and the current temperature may be sensed. Therefore, without direct reference to the concentration of the etchant, i.e., HF solution, the etching end point is accurately determined by monitoring the temperature of the etchant.

Figure 3:
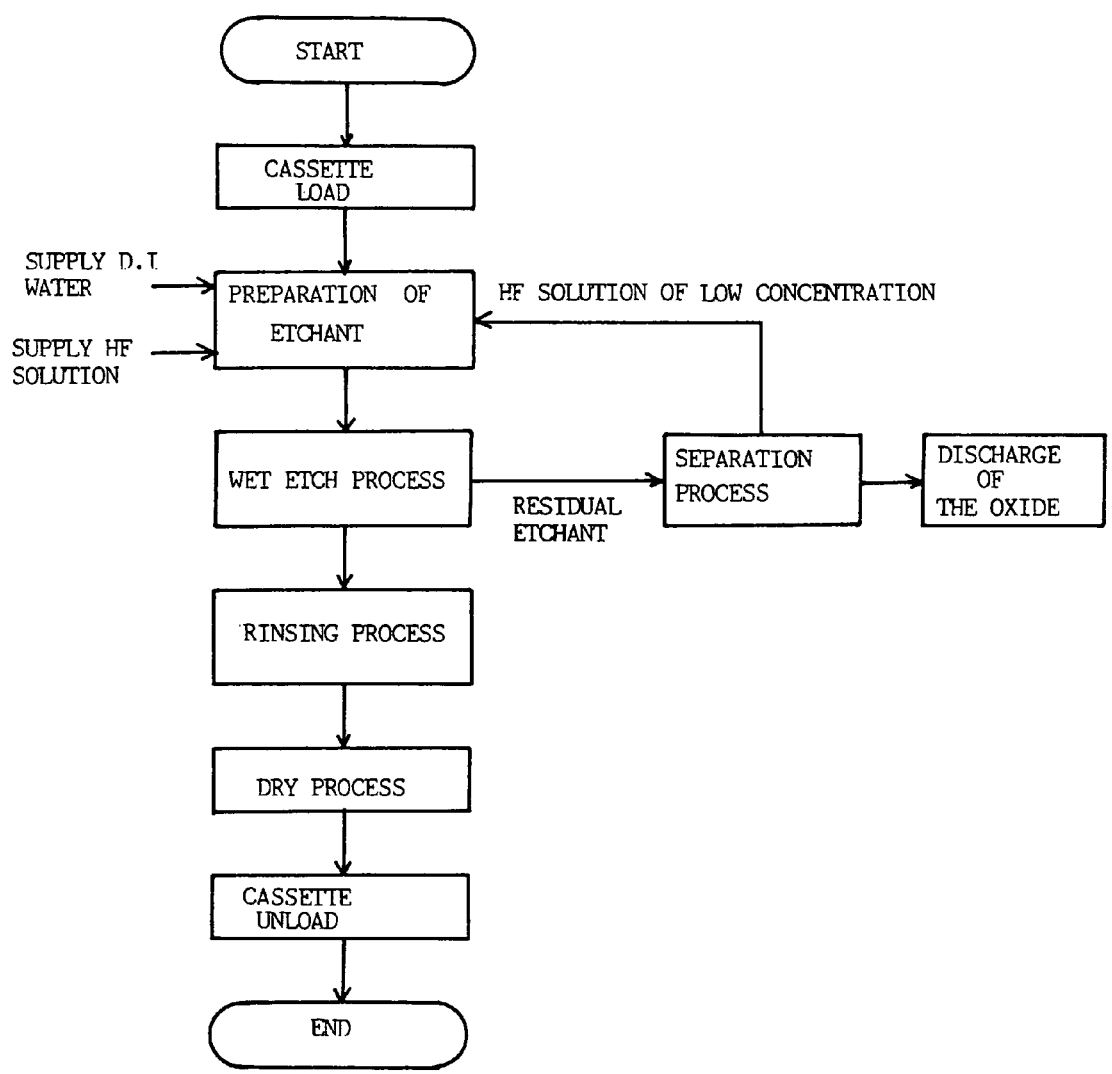
FIG. 3 is a flowchart showing the sequence of the processes which is performed in an etching apparatus according to a preferred embodiment of the present invention.

Operation of the etching apparatus and the etching process of the invention will be explained with reference to FIGS. 2 and 3. FIG. 3 is a flowchart showing the sequence of the process, which is performed in the etching apparatus of the present invention.

First, a cassette is positioned on the loader (not shown). Then, the valve V1 on the undiluted HF solution inlet pipe 16 is opened and the pump P1 is activated, so that the undiluted HF solution in the HF solution barrel 11 is supplied to the etchant diluting tank 12. At the same time, the valve V3 on the first D.I. water inlet pipe 14 is opened in order to supply the D.I. water through the D.I. water supply line 51 to the etchant diluting tank 12. As a result, the undiluted HF solution is diluted with the D. I. water. The amounts of the HF solution and D. I. water are controlled in such a way as to obtain a predetermined concentration of the etchant. Typically, the concentration of HF in the prepared etchant is about 5 to 30% and the undiluted HF solution has a concentration of about 40 to 60%. The concentration of HF in the prepared etchant is measured by the concentration measuring unit 15 in the etchant diluting tank 12. Then, the valve V9 installed on the second D.I. water inlet pipe 34 of the rinse bath 30 is opened to fill the rinse bath 30 with the D.I. water in the D.I. water supply line 51 for preparing the etching process. Thereafter, the heater 48 installed in the dry bath 40 generates heat energy and the IPA is introduced in the dry bath 40 to set up a drying condition.

When the preparation of the etchant is completed, the supply of the HF solution and D.I. water is stopped and the valve V2 on the etchant inlet pipe 21 is opened. Subsequently, a pump P2 is activated to fill the etch bath 20 with the etchant. The cassette on the loader is then dipped into the etch bath 20 to start the wet etch process of the glass substrates loaded in the cassette.

During this etching process, a nitrogen gas is supplied to the bubble generating plate 27 in order to enhance the etch process. The nitrogen gas supplied through the bubble generating plate 27 generates bubbles to stir the etchant. The nitrogen gas is continuously supplied into the etchant through the first nitrogen inlet pipe 22 by opening the valve V4 installed on the nitrogen supply line 52 so that the stirring of the etchant can continue throughout the etch process. Therefore, the bubbles are continuously generated in the etchant, and the circulation of the etchant is established. Accordingly, the etch process of the substrate is enhanced. Moreover, since the circulation of the etchant continuously removes the residual oxides on the surface of the glass substrate resulting from the wet etch process, the uniformity of the surface of the resultant substrates can be improved.

In the wet etch process, the etchant (the HF solution) and $SiO_2$ react with each other and the reaction energy is generated. Thus, the temperature of the etchant in the etch bath 20 increased. The temperature of the etchant is measured (or monitored) by the temperature sensor 60 in the etch bath 20. The temperature data obtained by the sensor 60 is constantly transmitted to the central control unit. Since the temperature of the etchant is raised according to the increase in the reaction energy generated by the etch process of the substrates, the temperature corresponds to the decrease in the thickness of the substrates: i.e., the increase in the etch thickness of the substrates. When the temperature of the etchant reaches the predetermined etching end point temperature, the central control unit transmits a signal to the etch bath 20 to terminate the etch process.

If substrates having the same material properties (such as glass substrates used in LCDs which have uniform thickness) are dipped into the etchant (HF solution) and the expected temperature changes during the etching process resulting from the material properties are predetermined as described above, the uniform etching process is achieved without directly monitoring or controlling the concentration of the HF solution. Moreover, the energy generated by the etch process for removal of a unit thickness of the substrate can be derived (which depends on the size and constitution of the glass substrate). Accordingly, the thickness of the substrate can be easily controlled even if the number of the substrates to be etched is varied.

When the etch process is completed, the etched glass substrates is conveyed to the rinse bath 30, and a rinse process is performed to clean the substrates. In the rinse process, the etchant and residues attached to the substrates are removed from the substrates using a spray and/or ultrasonic unit.

At the same time, the valve V6 on the outlet pipe 23 of the etch bath 20 is opened and the residual etchant in the etch bath 20 is discharged into the oxide separating tank 13. By leaving the etchant in the oxide separating tank 13 for about 30 minutes, oxide particles in the residual etchant is separated from the remaining HF solution of low concentration and precipitated in the lower portion of the tank 13. Then, the pump P3 is activated to transport the HF solution of low concentration in the upper portion of the oxide separating tank 13 to the etchant diluting tank 12 through the connecting pipe 17. Subsequently, the valve V10 in the oxide separating tank 13 is opened, and the oxide particles in the lower portion of the oxide separating tank 13 are discharged into the discharging line 53 through the outlet pipe 18. Here, if the bottom portion of the oxide separating tank 13 has a cone or pyramid shape, the discharge of the oxide particles is facilitated.

In order to reuse the HF solution of low concentration that is transported from the oxide separating tank 13 to the etchant diluting tank 12 as an etchant, the undiluted HF solution and D.I water are properly mixed with the HF solution of low concentration so that the etchant of a predetermined concentration can be obtained. When the etchant of the predetermined concentration is obtained, it is supplied to the etch bath 20 to fill the etch bath 20. A new set of cassettes are loaded in the etch bath 20, and a second wet etch process is started using the recycled etchant.

Meanwhile, the cassette that has been processed in the rinse bath 30 is conveyed to the dry bath 40 and a dry process is performed. The residual etchant removed from the substrates in the rinse process is discharged into the discharging line 53 through outlet line 39. Here, since the etchant discharged has the same volume as that in the rinse bath, the discharge of the etchant from the rinse bath 40 through the discharging line 53 facilitates the discharge of the oxide particles from the oxide separating tank 13.

When the dry process is completed, the cassette is transferred from the dry bath to the unloader (not shown in the figure) and separated from the unloader.

As discussed above, a series of processes including etching, rinsing, and drying operations are sequentially performed, and the valves and pumps installed on the respective inlet pipes, outlet pipes, and connecting pipes are automatically operated.

According to the present invention, the etching solution in the residual etchant is not entirely discharged and most of the etching solution is collected for reuse (recycled), by providing a device for purifying the residual etchant used in the etching process. Thus, the consumption of the undiluted etching solution used in composing the etchant can be considerably reduced. Furthermore, by finding the etching end point in terms of a temperature change in the etchant, it becomes possible to uniformly and consistently etch the glass substrates regardless of the concentration of the etchant.

It will be apparent to those skilled in the art that various modifications and variations can be made in the etching apparatus of the present invention without departing from the spirit or scope of the invention. Thus, it is intended that the present invention cover the modifications and variations of this invention provided they come within the scope of the appended claims and their equivalents.

What is claimed is:

1. An etching apparatus for etching a glass substrate comprising:
   an etch bath having a bubble plate, the glass substrate immersed in a first etchant, the etch bath containing a residual etchant including a diluted etchant and residue material after the glass substrate is etched with the first etchant, wherein a thickness of the glass substrate is uniformly reduced;
   a first nitrogen gas supplying pipe for supplying a nitrogen gas to the etch bath;
   a first nitrogen gas valve at the first nitrogen gas supplying pipe;
   a first tank connected to the etch bath to supply the first etchant to the etch bath, the concentration of the first etchant being controlled in the first tank;
   a second tank receiving the residual etchant from the etch bath and separating the diluted etchant from the residue material, the second tank being connected to the first tank to provide the separated diluted etchant to the first tank;
   a connecting passage directly connecting the first and second tanks and directly transferring the separated diluted etchant from the second tank to the first tank;
   an outlet pipe attached to the second tank, the outlet pipe discharging the residue material;
   a concentration measuring device disposed at the first tank for measuring a concentration of a first etchant in the first tank;
   a temperature sensor installed in the etch bath, the temperature sensor measuring and monitoring a temperature of the etchant while the glass substrate is etched in the etch bath based on the to temperature information from the temperature sensor;
   a rinse bath for cleaning the glass substrate that is etched in the etch bath;
   a second nitrogen gas supplying pipe for supplying the nitrogen gas to the rinse bath;
   a second nitrogen gas valve at the second nitrogen gas supplying pipe;
   a dry bath for drying the glass substrate that is rinsed at the rinse bath;
   a heater within the dry bath;
   an isopropyl alcohol supplying pipe for supply an isopropyl alcohol to the dry bath;
   a control unit controlling the first tank, the etch bath and the second tank, the control unit terminating the etching when a temperature of the first etchant reaches a termination temperature;
   undiluted HF solution tank to be connected to the first tank to supply an undiluted HF solution to the first tank;
   a water source connected to the first tank through a water supply pipe to supply a de-ionized water to the first tank; and
   a pump connected to the connection passage for pumping the diluted etchant from the second tank to the first tank,
   wherein the undiluted HF solution, the de-ionized water, and the separated diluted etchant are respectively supplied to the first tank from the undiluted HF solution tank, the water source, and the second tank to form the first etchant,
   wherein the amount of the undiluted HF solution, the de-ionized water, and the separated diluted etchant being controlled by the control unit controlling the first tank is based on the concentration measured by the concentration measuring device.

2. The etching apparatus according to claim 1, wherein the temperature sensor senses a target temperature to stop etching the glass substrate.

3. The etching apparatus according to claim 1, further comprising:
   an etching solution source for supplying an etching solution to the first tank.

4. The etching apparatus according to claim 3, wherein the first tank includes a first amount of the first etchant of a concentration from the etching solution, a second amount of the water, and a third amount of the diluted etchant.

5. The etching apparatus according to claim 3, wherein the etching solution includes HF solution.

6. The etching apparatus according to claim 1, wherein the outlet pipe is connected to a bottom of the second tank, and the bottom portion of the second tank has a cone shape.

* * * * *